United States Patent
Pijlman et al.

(10) Patent No.: US 10,281,639 B2
(45) Date of Patent: May 7, 2019

(54) SOLID STATE LIGHTING STRIP FOR MOUNTING IN OR ON A PANEL SUPPORT ELEMENT OF A MODULAR PANEL SYSTEM

(75) Inventors: Fetze Pijlman, Eindhoven (NL); Wilhelmus Petrus Adrianus Johannus Michiels, Reusel (NL); Cornelis Gerardus Maria de Haas, Nuenen (NL); Menno Van Baardwijk, Eindhoven (NL); Jochen Renaat Van Gheluwe, Lommel (BE); Siebe Tjerk De Zwart, Valkenswaard (NL); Theodorus Johannes Petrus Van Den Biggelaar, Veldhoven (NL); Michel Cornelis Josephus Marie Vissenberg, Roermond (NL); Maarten Marinus Johannes Wilhelmus Van Herpen, Heesch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 576 days.

(21) Appl. No.: 14/007,407

(22) PCT Filed: Mar. 30, 2012

(86) PCT No.: PCT/IB2012/051558
§ 371 (c)(1),
(2), (4) Date: Nov. 8, 2013

(87) PCT Pub. No.: WO2012/131636
PCT Pub. Date: Oct. 4, 2012

(65) Prior Publication Data
US 2014/0049980 A1    Feb. 20, 2014

(30) Foreign Application Priority Data
Mar. 31, 2011    (EP) .................................... 11160555

(51) Int. Cl.
*F21S 8/00* (2006.01)
*F21V 8/00* (2006.01)
(Continued)

(52) U.S. Cl.
CPC ............ *G02B 6/0035* (2013.01); *F21S 2/005* (2013.01); *F21S 8/026* (2013.01); *F21S 8/04* (2013.01);
(Continued)

(58) Field of Classification Search
CPC .......... F21S 28/026; F21S 28/04; F21S 8/026; F21S 8/04; F21S 8/043; F21S 8/046;
(Continued)

(56) References Cited

U.S. PATENT DOCUMENTS 3,782,082 A * 1/1974 Smith .................... B01D 46/12
                                                    454/284
4,057,947 A * 11/1977 Oide ....................... E04B 9/064
                                                    52/483.1
(Continued)

FOREIGN PATENT DOCUMENTS

CN    1128333 A    8/1996
CN    1165934 A    11/1997
(Continued)

OTHER PUBLICATIONS

Tsuji, Device for Supporting Light Emitting Modules, Dec. 30, 2009, WO2009157467A1, English.*

*Primary Examiner* — Bryon T Gyllstrom
*Assistant Examiner* — James M Endo
(74) *Attorney, Agent, or Firm* — Akarsh P. Belagodu (57) ABSTRACT

A solid state lighting strip (100) for mounting in or on a panel support element (210) of a modular panel system (200) including a plurality of solid state lighting elements (110, 110'), a light extraction layer (120) and a glare
(Continued)

reducing layer (130) is disclosed. The solid state lighting elements are arranged such that the light emitted by said elements is coupled into the glare reducing layer via the light extraction layer. The solid state lighting strip (100) can be used as part of a lighting system, a panel support element (210) and a modular panel system (200).

14 Claims, 6 Drawing Sheets

(51) Int. Cl.
  *F21S 2/00* (2016.01)
  *F21S 8/04* (2006.01)
  *F21S 8/02* (2006.01)
  *F21V 33/00* (2006.01)
  *E04B 9/00* (2006.01)
  *F21Y 115/10* (2016.01)

(52) U.S. Cl.
  CPC ............ *F21V 33/006* (2013.01); *G02B 6/001* (2013.01); *E04B 9/006* (2013.01); *F21V 2200/20* (2015.01); *F21Y 2115/10* (2016.08)

(58) Field of Classification Search
  CPC ...... F21S 8/066; F21V 2200/20; F21V 33/06; F21V 33/006; F21V 21/04; F21V 21/048; F21V 21/049; F21V 21/047; E04B 9/006; E04B 9/18; E04B 9/008; E04B 9/241; E04B 9/24; E04B 9/242
  USPC ............................... 362/147, 148, 150, 602
  See application file for complete search history.

(56) References Cited

U.S. PATENT DOCUMENTS

| | | | | |
|---|---|---|---|---|
| 5,613,759 | A * | 3/1997 | Ludwig | E04B 9/006 362/149 |
| 5,865,674 | A * | 2/1999 | Starr | B01D 46/0005 454/187 |
| 6,871,983 | B2 * | 3/2005 | Jacob | F21S 8/04 362/147 |
| 7,722,220 | B2 * | 5/2010 | Van De Ven | F21V 29/2212 362/294 |
| 2002/0021564 | A1 | 2/2002 | Cho et al. | |
| 2002/0112424 | A1 * | 8/2002 | Zaborowski | E04B 9/006 52/220.6 |
| 2004/0213003 | A1 * | 10/2004 | Lauderdale | E04B 9/006 362/404 |
| 2005/0219860 | A1 * | 10/2005 | Schexnaider | F21S 8/04 362/601 |
| 2006/0262521 | A1 * | 11/2006 | Piepgras | E04B 9/006 362/149 |
| 2007/0012847 | A1 * | 1/2007 | Tai | E04B 9/006 248/343 |
| 2007/0133193 | A1 * | 6/2007 | Kim | E04B 9/32 362/147 |
| 2008/0232093 | A1 | 9/2008 | Kim | |
| 2010/0060195 | A1 * | 3/2010 | Tsuboi | A61M 21/00 315/294 |
| 2010/0172129 | A1 * | 7/2010 | Hsieh | F21S 8/026 362/217.05 |
| 2010/0254121 | A1 | 10/2010 | Zhou | |
| 2010/0284185 | A1 * | 11/2010 | Ngai | E04B 9/00 362/235 |
| 2011/0175533 | A1 * | 7/2011 | Holman | E04B 9/32 315/130 |
| 2011/0222270 | A1 * | 9/2011 | Porciatti | E04B 9/006 362/147 |

FOREIGN PATENT DOCUMENTS

| | | | | |
|---|---|---|---|---|
| CN | 101297155 | A | 10/2008 | |
| CN | 101598285 | A | 12/2009 | |
| CN | 201487753 | U | 5/2010 | |
| CN | 201507807 | U | 6/2010 | |
| CN | 101858129 | A | 10/2010 | |
| GB | 2241056 | A | 8/1991 | |
| GB | 2401675 | A | 11/2004 | |
| GB | 2461935 | A * | 1/2010 | ............. F21S 8/026 |
| JP | 3161024 | A | 7/1991 | |
| JP | 9-67894 | A | 11/1997 | |
| JP | 2005513745 | T2 | 5/2005 | |
| JP | 2007265811 | A2 | 10/2007 | |
| JP | 2008090270 | A2 | 4/2008 | |
| JP | WO 2009157467 | A1 * | 12/2009 | |
| JP | 2010147014 | A2 | 7/2010 | |
| JP | 2010243825 | A2 | 10/2010 | |
| WO | 2008058585 | A1 | 5/2008 | |

* cited by examiner

SOLID STATE LIGHTING STRIP FOR MOUNTING IN OR ON A PANEL SUPPORT ELEMENT OF A MODULAR PANEL SYSTEM

FIELD OF THE INVENTION

The present invention relates to luminaires for modular panel systems such as a suspended ceiling. The present invention further relates to a lighting system comprising such a luminaire. The present invention yet further relates to a support element comprising such a luminaire. The present invention yet further relates to a modular panel system comprising such a luminaire.

BACKGROUND OF THE INVENTION

In construction, modular panel systems are commonly used to reduce build cost and construction time. Modular panel systems typically allow for the rapid construction of floors, walls and ceilings, albeit often at the compromise of reduced aesthetic appearance. A prime example of such a modular panel system is a suspended ceiling, which can be found in most professional environments, such as for example office spaces. A suspended ceiling typically comprises a metal or plastic grid defining rectangular or square recesses, which are filled with tiles to form a continuous ceiling.

In such modular systems, e.g. a suspended ceiling, lighting may be integrated into the system, typically by replacing one or more tiles with a lighting unit such as a luminaire. Most suspended ceilings comprise luminaires in which a number of fluorescent light tubes are present. For a number of reasons, such luminaires are not ideal. Firstly, such luminaires are considered aesthetically displeasing, i.e. obtrusive. Secondly, in order to improve light efficiency from such luminaires, they usually contain a reflector, which commonly has a parabolic shape. This however can cause glare for an occupant of the office space if the reflected light exits the luminaire under shallow angles to the plane of the modular system. Glare can be very disturbing in an office environment, as it can obscure the image on a computer monitor and can cause physical discomfort, e.g. headaches or sight problems, to the occupant when being subjected to the glare for a prolonged period of time. This is why health and safety standards such as the IEC60598-1:2008 standard in Europe require lighting solutions to comply with stringent requirements for preventing excessive glare levels.

Figure 1:
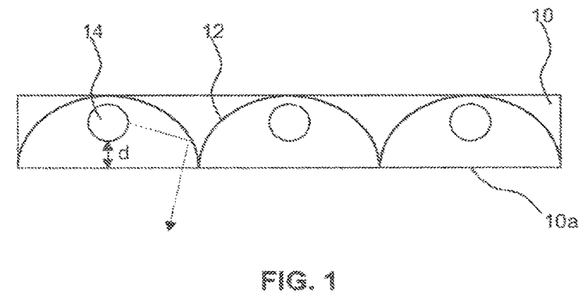
FIG. 1 schematically depicts a prior art luminaire for a modular panel system.

Solutions exist to overcome glare. A straightforward solution is shown in FIG. 1, in which a suspended ceiling luminaire 10 is shown. The luminaire 10 comprises a plurality of chambers defined by respective parabolic reflectors 12, with a fluorescent light tube 14 fitted in each of the chambers. Each light tube 14 is offset from the light exit plane 10a of the luminaire 10 by a distance d such that light emitted by the fluorescent light tube 14 under a shallow angle is reflected by the parabolic reflector 12, as indicated by the dotted broken arrow. This increases the exit angle of the light, thus reducing glare. A drawback is that this solution leads to relatively bulky luminaires, which can be considered aesthetically unsatisfactory.

Figure 2:
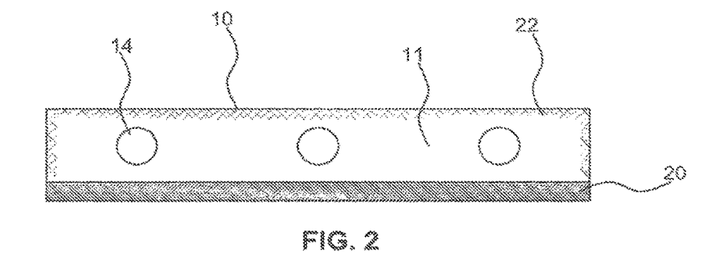
FIG. 2 schematically depicts another prior art luminaire for a modular panel system.

Another solution is shown in FIG. 2, in which a luminaire 10 for integration in a suspended ceiling is fitted with a micro-lens optical plate or diffuser 20, which has the function of preventing shallow angle light beams from exiting the luminaire 10. As this causes a substantial amount of light being reflected back into the chamber 11 of the luminaire 10, the luminaire 10 may comprise a reflector 22 to recycle such reflected light. Commonly, the micro-lens optical plate takes the form of a prism plate.

The company SwitchMade offer a light emitting diode based (LED) luminaire marketed under the name Paneos® for integration in a suspended ceiling. This has the advantage of lower energy consumption compared to fluorescent light tube-based luminaires. However, as these luminaires replace tiles in the ceiling, they still disrupt the visual appearance of the suspended ceiling.

The Gemino Company (www.gemino.it) markets a suspended ceiling solution in which the light fittings can be integrated into the band raster of the ceiling. The band raster consists of the main structural beams of the suspended ceiling. With smaller form factor lighting such as LED lighting this is a feasible solution, and has the advantage of the improved appearance of the ceiling due to the fact that no tiles need replacing with luminaires. This however increases the manufacturing complexity of the band raster, and thus the cost of the overall design. Moreover, this solution is unsuitable for retrofitting purposes, and is difficult to maintain as the band raster cannot be easily disassembled for maintenance purposes.

SUMMARY OF THE INVENTION

The present invention seeks to provide a lighting solution that can be easily (retro-)fitted to existing modular panel systems whilst being compliant with health and safety standards.

In accordance with a first aspect of the present invention, there is provided a solid state lighting strip for mounting in or on a panel support element of a modular panel system, the strip comprising a plurality of solid state lighting elements, a light extraction layer and a glare reducing layer, wherein the solid state lighting elements are arranged such that the light emitted by said elements is coupled into the glare reducing layer via the light extraction layer.

The present invention is based on the insight that the combination of the light extraction layer and the glare reducing layer makes it possible to produce a solid state lighting strip that can be kept very thin, e.g. 2 mm, such that it can be fitted to panel support elements of a modular panel system such as a suspended ceiling. Consequently, the use of luminaires in the panel system can be avoided altogether, in particular if the pitch of the system is relatively small and/or the light output of the solid state lighting strip is sufficiently high. This improves the appearance of the modular panel system. It is further possible to retrofit the solid state lighting strip of the present invention to existing modular panel systems, e.g. using suitable clips, such that it is not necessary to replace large parts of the modular panel system to improve its appearance by elimination of luminaires suspended in the grid. The combination of the light extraction layer and the glare reducing layer further makes it possible to sufficiently eliminate glare such that the solid state lighting strip complies with the relevant requirements for use in working environments.

Preferably, the light extraction layer and the glare reducing layer are arranged opposite each other, and wherein the plurality of solid state lighting elements are arranged adjacent to the light extraction layer. The edge orientation of the solid state lighting elements reduces the overall thickness of the solid state lighting strip, thereby further facilitating its ease of integration into a modular panel system.

In an embodiment, the solid state lighting strip further comprises a housing having a first surface in a length direction of the strip, said first surface including a light exit window, and side surfaces on opposite sides of the first surface, wherein the glare reducing layer is placed against the light exit window, and the solid state lighting elements are placed at regular intervals between the light extraction layer and at least one of the side surfaces. The housing, which is opaque, ensures that the light generated by the solid state lighting elements is only transmitted through the glare reducing layer, and improves the robustness of the solid state lighting strip.

In order to improve the light efficiency of the solid state lighting strip, the surface of the light extraction layer opposite the surface facing the glare reducing layer may carry a reflective member such that light generated by the solid state lighting elements is more effectively coupled into the light extraction layer. To further improve the light efficiency of the solid state lighting strip, the inner walls of the housing may be made reflective.

It is preferred that the glare reducing layer is a micro-lens optical plate. More preferably, the micro-lens optical plate is a foil having a thickness of 1 mm or less such that the overall thickness of the solid state lighting strip can be kept to a few mm only, which makes the solid state lighting strip particularly inconspicuous when fitted to a panel support element of a modular panel system.

In another embodiment, the plurality of solid state elements comprises a first group of solid state elements and a second group of solid state elements on opposite sides of the light extraction layer to increase the light intensity that can be generated by the solid state lighting strip.

Preferably, the first and second group of solid state elements each comprise subsets of solid state lighting elements having different colors, said subsets being individually controllable. This has the advantage that the overall color of the solid state lighting strip can be varied by varying the output intensities, i.e. the drive current, of the solid state elements in the first and second groups.

The pitch of the solid state elements in said groups may be less than twice the width of the light extraction layer as at this ratio a sufficient uniformity of the generated light is guaranteed. Preferably, the solid state lighting elements in the first group are offset in relation to the solid state lighting elements in the second group by half a pitch as this improves the uniformity of the light produced by the solid state lighting strip.

According to a further aspect of the present invention, there is provided a lighting system including a plurality of solid state lighting strips of the present invention, the lighting system further comprising a controller for setting the light output of individual solid state lighting strips as a function of at least one of incident daylight, room layout and room occupancy. This allows for the output of the solid strip lighting to be adapted to localized needs, e.g. in areas such as corridors, office spaces, printing areas and so on, and/or adapted in the presence of an occupant of the room. To this end, the lighting system may further comprise a presence sensor for detecting the presence of an individual in said room, the controller being responsive to the presence sensor.

According to yet another aspect of the present invention there is provided a support element for a modular panel system comprising a solid state lighting strip of the present invention. The solid state lighting strip may be attached to or integrated into the support element.

According to yet another aspect of the present invention there is provided a modular panel system comprising a support grid comprising support members for attaching to a building structure and support elements for extending between support members and a plurality of panels dimensioned to be supported by the support grid, wherein the support grid comprises a plurality of solid state lighting strips of the present invention. The solid state lighting strips preferably are integrated in or attached to the support elements.

Preferably, the ratio between the width of the exit window of the solid state lighting strips and the pitch of the panel support elements in the support grid is chosen in the range of 0.02-0.08 to ensure that the lighting levels in the room comply with glare requirements. More preferably this ratio is chosen to be 0.04.

BRIEF DESCRIPTION OF THE DRAWINGS

Embodiments of the invention are described in more detail and by way of non-limiting examples with reference to the accompanying drawings, wherein:

FIGS. 12a to 12c schematically depict lighting strips according to embodiments of the present invention comprising shielding reflectors, wherein FIGS. 12c and 12d show the presence of additional shielding reflectors.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 3:
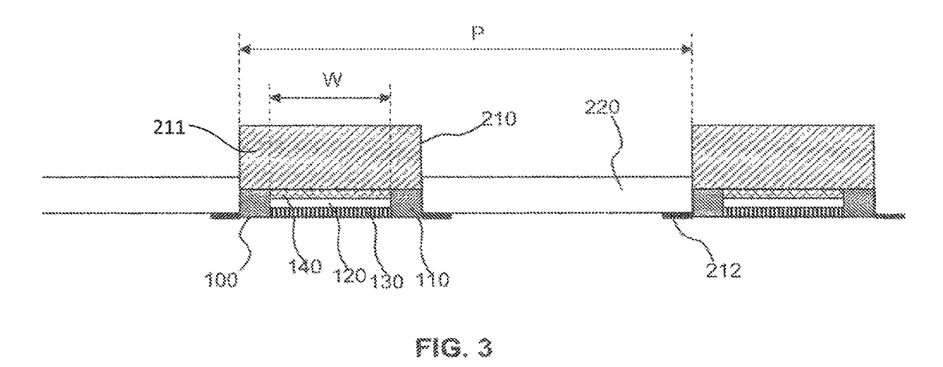
FIG. 3 schematically depicts a part of a modular panel system including a solid state lighting strip according to an embodiment of the present invention.

FIG. 3 depicts a panel support element 210, including a support structure 211, of a modular panel system 200, which is designed to support panels or tiles 220. To this end, the panel support element 210 may comprise a lip 212 onto which the panel or tile 220 rests. Examples of such modular panel systems 200 include suspended ceilings and floors.

The panel support element 210 comprises a solid state lighting strip 100 in which side-emitting LEDs 110 are placed adjacent to a light extraction layer 120 such as a light guide layer, which at regular intervals couples the light received from the side-emitting LEDs 110 out to a glare reducing layer 130, which ensures that the intensity of light emitted from the solid state lighting strip 100 under shallow angles with the plane formed by the panels 220 is kept sufficiently low to suppress glare for inhabitants of a room in which the modular panel system 200 is fitted. The provision of light from the LEDs 110 to the glare reducing layer 130 through a light extraction layer 120 further ensures that the glare reducing layer 130 is illuminated in a uniform manner, thus improving the uniformity of the light output of the solid state lighting strip 100. The light extraction layer 120 may comprise a plurality of regularly spaced light extraction elements, e.g. grooves, to couple the light into the glare reducing layer 130. Alternatively, the light extraction layer may comprise a beam-shaped member carrying a plurality of protrusions facing the glare reducing layer 130. In a cost-effective embodiment, the protrusions may take the form of dots of (white) paint. The protrusions are preferably arranged in a regular pattern such that a homogeneous light extraction is obtained.

The glare reducing layer 130 preferably is a micro-lens optical (MLO) plate or prism plate, which preferably is in the form of a thin foil having a thickness of less than 5 mm, and more preferably no more than 1 mm. It has been found that such a foil can be used when the LEDs 110 can be operated in the so-called Safe Extra Low Voltage Domain, for which the fire proof requirements as for instance tested by the 5 VA and glowwire tests are less stringent. Such a mode of operation may for instance be achieved if the density of luminaires 100 in the modular panel system 200 is high enough to ensure sufficient lighting levels in the room when operating the luminaires 100 in the safe extra low voltage domain, as will be explained in more detail below.

The glare reducing layer 130 typically reflects substantial amounts of light originating from the light extraction layer 120 back into this layer. It is therefore advantageous to provide a reflective layer 140 such that the light extraction layer 120 is sandwiched between the reflective layer 140 and the glare reducing layer 130. The reflective layer 140 may for instance be a reflective foil, a layer of white paint applied to the surface of the panel support element 210 facing the solid state lighting strip 100 or to the surface of the light extraction layer 120 facing the panel support element 210. Other embodiments of such a reflective layer 140 are equally feasible.

The use of a MLO plate or foil 130 makes it possible to keep the overall thickness of the solid state lighting strips 100 to less than 5 mm, in particular when side-emitting LEDs 110 are used that are placed at the sides of (i.e. adjacent to) the light extraction layer 120. This reduces the weight and cost of the luminaire as fewer materials need to be used to realize the desired lighting levels.

The dimensions of the MLO layer 130, or more precisely, the width W of the exit window of the MLO layer 130, are preferably chosen to be 0.04 times the pitch P of the panel support elements 210 as shown in FIG. 3, as at this ratio the optimal tradeoff between light output and minimalistic appearance is achieved. A commonly used width for panel support elements 210 is 2.4 cm. By defining the pitch of the support elements 210 (in the width direction) at 60 cm, sufficient luminance levels can be achieved in a room whilst driving the luminaires 100 in the safe extra low voltage domain, as previously mentioned. Satisfactory results are still obtained if the aforementioned ratio lies in the range of 0.02-0.08.

If the value of this ratio falls below 0.02 the density of panel support elements 210 becomes too high for the modular system 100 to be cost-effective, and its appearance becomes unsatisfactory. If the value of this ratio exceeds 0.08 the spacing between luminaires 100 increases to such an extent that the output levels of each luminaire 100 have to increased to ensure homogeneous lighting of the room to such a level that glare can no longer be avoided; i.e. the luminaires 100 can no longer be operated in the safe extra low voltage domain.

Hence, an important insight of the present invention is that by dimensioning the solid state lighting luminaires or strips 100 in a modular panel system 200 such that the width of the light exit window of the luminaire 100 falls within the W/P ratio of 0.02-0.08, the output levels per luminaire 100 can be reduced to such an extent that the intensity of emitted light that is perceived as glare can be kept to allowable levels as dictated in the various legislatory standards.

The solid state lighting strip or luminaire 100 preferably has a light output in lumen in excess of 500 times the pitch (in meters) of the elements used per meter of solid state lighting strip or luminaire 100. This leads to typical lumen outputs per meter luminaire of more than 150 lumen till 600 lumen. This typically ensures that no additional lighting has to be present in a room fitted with the modular panel system 200 of the present invention, i.e. a modular panel system including the solid state lighting strips 100. It is also preferred that the pitch of the panel support elements 210 in the modular panel system 200 is chosen in the range of 0.3-3.0 meters for indoor use as this ensures sufficiently uniform lighting levels in the room.

Upon assembly of the modular panel system 200 in a room, the support elements 210 are preferably aligned parallel to the window(s) in the room that receive most daylight. As the solid state lighting strips 100 in support elements 210 typically are individually controllable, this makes it straightforward to adjust the lighting levels in the room to the incident daylight, i.e. by dimming the solid state lighting strips 100 in support elements 210 near to the window by a larger extent than the solid state lighting strips 100 in support elements 210 further away from the window.

To this end, the plurality of solid state lighting strips 100 on different support elements 210 typically form part of a lighting system that further comprises a controller 900 (shown in FIG. 9) for adjusting the output of the individual solid state lighting strips 100 in accordance with lighting requirements in the room. Such control signals may for instance be configured to adjust the lighting levels in accordance with a layout of a room comprising the modular panel system 200. For instance, the room may be partitioned into work areas connected to each other by one or more corridors, in which the work areas are to receive higher lighting levels than the corridors. To this end, the controller may increase the light output of the solid state lighting strips 100 located over the work areas whilst reducing the light output of the solid state lighting strips 100 located over the corridors.

Similarly, the controller may adapt the light output of the solid state lighting strips 100 to compensate for disruptions in the regularity of the grid of the modular panel system 200, for instance if the modular panel system 200 is fitted around air ventilation shafts or air-conditioning units. The controller may be adapted to increase lighting levels in the vicinity of such disruptions to compensate for the absence of lighting underneath such disruptions.

The lighting system may further comprise one or more sensors, such as daylight sensors and/or presence sensors for detecting the presence of an individual in the room, with the controller being responsive to these sensor(s) such that the lighting levels can be adapted accordingly.

At this point it is noted that MLO-based glare reducing layers 130 can have a metallic appearance at relatively high light output levels. This is sometimes considered unappealing. A presence sensor may be used to adjust the lighting levels in the presence of one or more individuals in the room to sufficient levels to allow the individuals to perform their activities, with these light levels being sufficiently low to avoid the metallic appearance of the MLO-based glare reducing layer 130 such that overall appearance of the modular panel system 200 is improved.

In FIG. 3, the solid state lighting strip 100 is integrated into the panel support elements 210, which preferably are secondary support elements of the modular panel system 200, i.e. elements that are not fixed to a floor, wall or ceiling of a room, such that the panel support elements 210 can be easily replaced in case of, e.g. an end of life malfunction of the solid state lighting strip 100, i.e. without having to remove the primary support elements from the ceiling, wall or floor. This also has the advantage that the solid state lighting strip can be easily retrofitted in existing modular panel systems by replacing the support elements of the modular panel system with the panel support elements 210 of the present invention.

The support element 210 including luminaire 100 may have a light exit window of 24 mm (width) by 60 cm (length). Such a luminaire would have a light output of around 250 lm. Such a support element 210 may be used in a modular panel system 200 such as a suspended ceiling, by setting these luminaires in lines of panel support elements 210 having a pitch of 60 cm as previously explained. Other dimensions are equally feasible.

Figure 4:
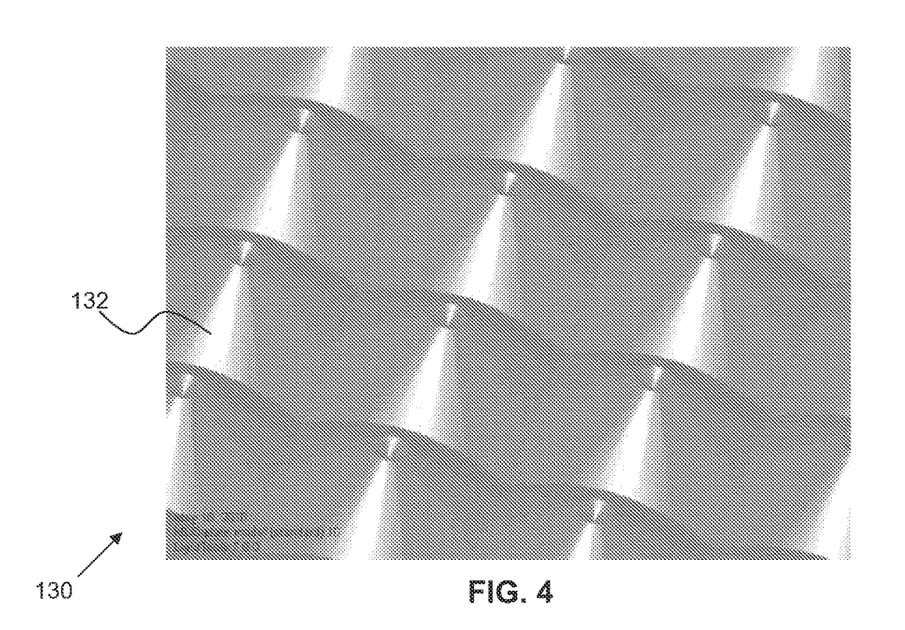
FIG. 4 schematically depicts a non-limiting example of a glare reducing layer suitable for use in the solid state lighting strip of the present invention.

FIG. 4 shows a non-limiting example of a MLO-based glare reducing foil 130, which consists of a rectangular array of cones 132 with a top angle of 108° and a pitch of 50 micrometers. The small dimple in the top of each cone 132 is present for manufacturing reasons. The pitch of the cones 132 may be varied without departing from the scope of the present invention. The cones may be made of any suitable transparent material, e.g. PMMA or polycarbonate. As such MLO-based glare reducing layers 130 are known per se, their manufacture will not be explained in further detail for the sake of brevity. Alternative embodiments of the glare reducing layer 130 are also feasible; an example of another suitable glare reducing layer 130 can for instance be found in WO2008058585 A1.

Figure 5:
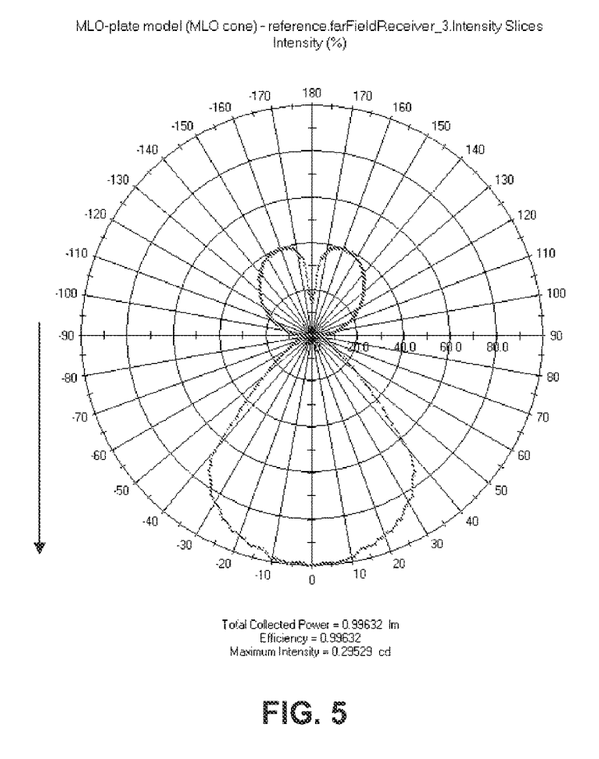
FIG. 5 depicts the simulation results of the light distribution of the glare reducing layer of FIG. 4 when used in conjunction with a lambertian light source.

FIG. 5 depicts the simulated angular light intensity distribution of the MLO foil 130 shown in FIG. 4 when a lambertian light source is placed below the MLO foil 130. The arrow indicates the direction of the light rays that have passed through the MLO foil 130. The light transmitted in the opposite direction is light that has been reflected by the MLO foil 130. Such reflected light can be recycled by the use of diffuse reflectors as previously explained.

As can be seen in FIG. 5, the light intensity at a 65° angle relative to the vertical light emission axis is very low. As light emitted at around these angles typically causes glare, it can be seen that the MLO foil 130 can effectively suppress glare. For the MLO foil 130 in a luminaire 100 in a modular panel system 200 at a W/P ratio of 0.04 and operating at a luminance output of 380 lm/m luminaire, luminance levels at 65° have been found to be at around 1100 cd/m$^2$, which is well below the requirement of such levels not exceeding 1500 cd/m$^2$. This equated to a glare evaluation rating according to the UGR method of less than 17, which is well under the UGR requirement of 19 or less.

Figure 6:
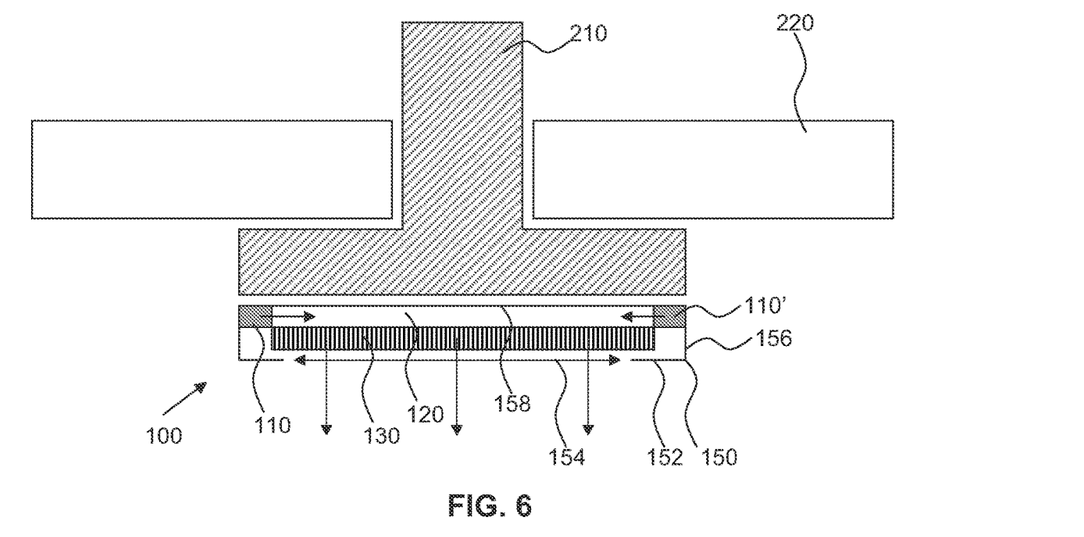
FIG. 6 schematically depicts a part of a modular panel system including a solid state lighting strip according to another embodiment of the present invention.

FIG. 6 shows an alternative embodiment of a solid state lighting strip 100, which is particularly suited for retrofitting purposes. The solid state lighting strip 100 is fitted to the exposed surface of a panel support element 210 rather than being integrated into the panel support element 210. The panel support element 210 is T-shaped by way of non-limiting example only. The solid state lighting strip 100 comprises a housing 150 including a bottom surface 152 including a light exit window 154, a top surface 158 facing the T-shaped panel support element 210 and side surfaces 156 extending from the bottom surface 152 to the top surface 158 in a length direction of the housing 150. The glare reducing layer 130 is fitted, e.g. fixated over the light exit window 154, with the light extraction layer 120 being located in between the top surface 158 and the glare reducing layer 130. The glare reducing layer 130 may be kept in place by a reflective surround, which improves the light output of the solid state lighting strip 100.

Side-emitting LEDs 110 and 110' are located in between the light extraction layer 120 and one of the side walls 156 such that their light output (as indicated by the horizontal arrows) is coupled into the light extraction layer 120 for coupling out the light such that shallow angled light beams are largely avoided (as indicated by the vertical arrows).

The material of the housing 150 may be flexible, e.g. made of a plastics material. The housing 150 may be reflective on the inside to maximize the light output of the solid state lighting strip 100. Any suitable reflective material may be used. The material of the housing 150 may be reflective or the inner surfaces of the housing 150 may be coated with a reflective material. In addition, a reflective layer may be present between the upper surface 158 of the housing 150 and the light extraction layer 120.

The outer surface of the upper surface 158 may contain an adhesive for fixing the solid state lighting strip 100 to the panel support element 210. Alternatively, the solid state lighting strip 100 may be clamped to the panel support element 210 using suitable clamps. Alternative fixation means will be apparent to the skilled person. Although the embodiment of the solid state lighting strip 100 in FIG. 6 is shown separate to the panel support element 210, it should be understood that it is equally feasible to integrate this embodiment into a panel support element 210 as shown in FIG. 3.

Figure 7:
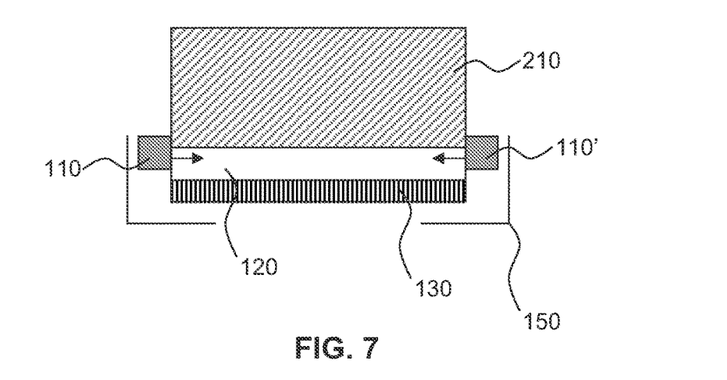
FIG. 7 schematically depicts a part of a modular panel system including a solid state lighting strip according to another embodiment of the present invention.

FIG. 7 shows yet another embodiment of the solid state lighting strip 100, in which the LEDs 110 and 110' are placed in parallel with and on the edge of the panel support element 210, and in which the housing 150 forms a cladding around the support element 210. The LEDs 110 and 110' may be high-power LEDs in this embodiment. This embodiment is also particularly suitable for retrofitting purposes. Alternatively, such a solid state lighting strip 100 may be fitted to a panel support element 210 during its assembly.

Figure 8:
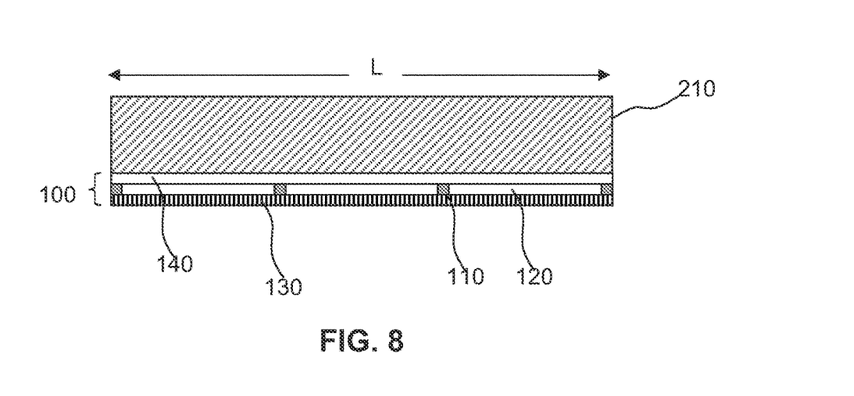
FIG. 8 schematically depicts an aspect of a solid state lighting strip according to an embodiment of the present invention.

In case of the panel support element 210 exceeding a certain length L, e.g. 1 meter, it may be advantageous to separate the light extraction layer 120 in separate portion for light efficiency reasons. This is shown in FIG. 8, which shows a side view of a panel support element 210 with a solid state lighting strip 100. The light extraction layer portions 120 are preferably arranged at regular intervals, i.e. in a period. The LEDs 110 and 110' may be placed in the gaps between the light extraction layer portions 120 as this regions will remain dark when the light extraction layer portions 120 light up, thus concealing the LEDs 110 and 110'.

Figure 9:
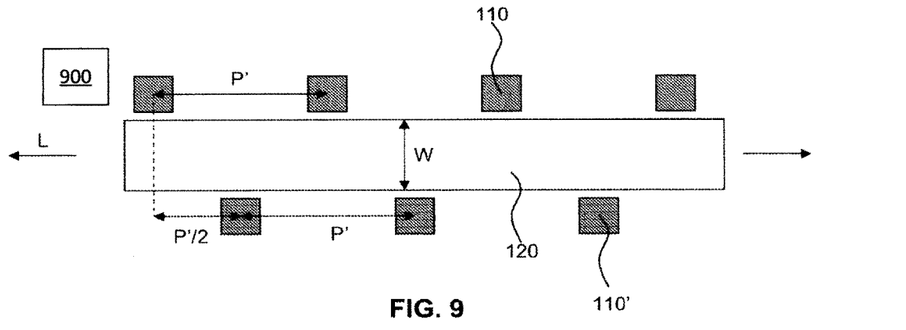
FIG. 9 schematically depicts a part of a modular panel system including a solid state lighting strip according to yet another embodiment of the present invention.

FIG. 9 depicts a preferred layout of the LEDs 110 and 110' in a solid state lighting strip 100 adjacent to the light extraction layer 120, e.g. a light guide. The LEDs 110 and 110' are preferably regularly spaced at a pitch P' which is at most twice the width W of the light extraction layer 120 to ensure a uniform light output. In addition, the LEDs 110' in the second group of LEDs are preferably displaced by half a pitch P' (i.e. P'/2) in the length direction L compared to the LEDs 110 in the first group of LEDs. This ensures that the uniformity of the light produced by the light extraction layer 120 and the solid state lighting strip 100 is further improved.

A relatively large pitch P' has the advantage that the luminaire itself may be more efficient as less light is absorbed in the LEDs 110 and 110'. A small relatively small pitch P' has the advantage that the output of luminaire 100 will look more uniform. In general the pitch P of the LEDs 110 and 110' will be governed by the required lumen output of the luminaire 100. In anyway, the pitch P is likely to be less than 5 cm for uniformity reasons.

In an embodiment, the groups of LEDs 110 and 110' comprise subsets of LEDs having different white colors, e.g. a warm white and a cold white color. By making these subsets individually controllable, the light temperature of the light output of the solid state lighting strip 100 can be controlled.

It should be emphasized that it is also feasible to delete of the groups of LEDs, i.e. to have LEDs on one side of the light extraction layer 120 only. It is also not necessary that subsets of LEDs 110 and LEDs 110' have different colors are present; it is equally feasible that each group of LEDs 110 and 110' has a single color only, in which the LEDs on different sides of the light extraction layer 120 may be controlled by a single control signal.

Figure 10:
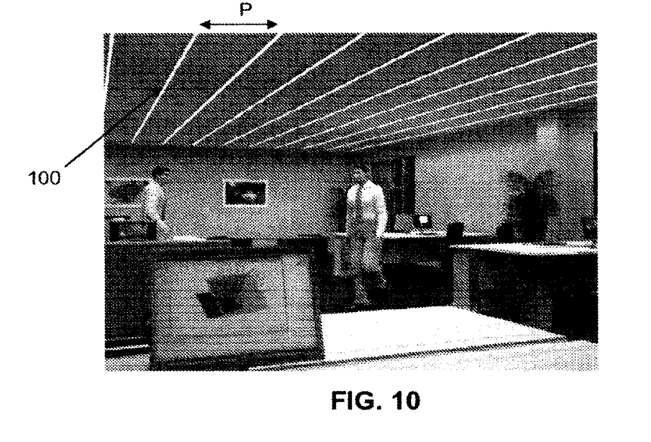
FIG. 10 schematically depicts a room with a modular panel system according to an embodiment of the present invention.

FIG. 10 shows a simulation of the appearance of a room fitted with a modular panel system, here a suspended ceiling, comprising solid state lighting strips or luminaires 100. The modular panel system may have primary support beams, e.g. band rasters, which run perpendicularly to the luminaires 100, with support elements extending between adjacent primary support beams being extended with the luminaires 100. Simulations have demonstrated that for a solid state lighting strip 100 having a width of 24 mm and a length of 60 cm in a ceiling having lines of panel support elements 210 at a pitch P of 60 cm, a luminance of 500 lux can be achieved at the working surfaces in the room by having each solid state lighting strip 100 having a luminous output of 230 lumen, i.e. 380 lumen/m of the strips 100.

Figure 11:
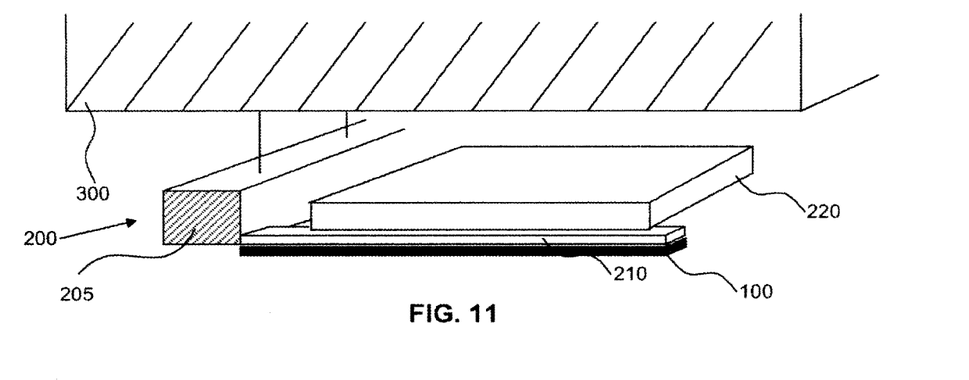
FIG. 11 schematically depicts a modular panel system according to an embodiment of the present invention in more detail.

As shown in FIG. 11, which depicts a non-limiting example of a modular panel system 200, the primary support beams 205 of the modular panel system 200 are suspended from the ceiling 300 of a room, with the panel support elements 210 carrying the panels or tiles 220 extending between primary support beams 205. The luminaire 100 is fitted to the panel support elements 210, for instance by integration into the panel support elements 210 or by attachment thereto, as previously explained. As the panel support elements 210 can be easily removed from the modular panel system 200 without dismantling the whole system, e.g. removing it from the ceiling 300, it is straightforward and cost-effective to retrofit the luminaire 100 into the modular panel system 200, either by replacing a prior art panel support element 210 with a panel support element 210 of the present invention, or by attaching the luminaire 210 to an existing panel support element 210. It is of course also feasible to integrate a luminaire 100 of the present invention into a primary support beam 205 or retrofit it thereto, although this is likely to be less straightforward and not as cost-effective as the (retro-)fitting to panel support elements 210. It is reiterated that for a modular panel system 200 in accordance with the present invention, it is preferred that the ratio of the width W of the exit window the solid state lighting strips 100 and the pitch P of the panel support elements 210 is chosen in the range 0.02-0.08, and W/P preferably is 0.04 for the reasons already explained above.

To prevent the solid state lighting elements that are arranged adjacent to the light extraction layer from being visible as bright spots along the edge of the solid state lighting strip (which can happen due to light reflections and/or the presence of imperfections in the lighting strip), a shielding reflector can be placed at the edge and at the viewing side of the lighting strip. This is shown in FIG. 12.

Figure 12A:
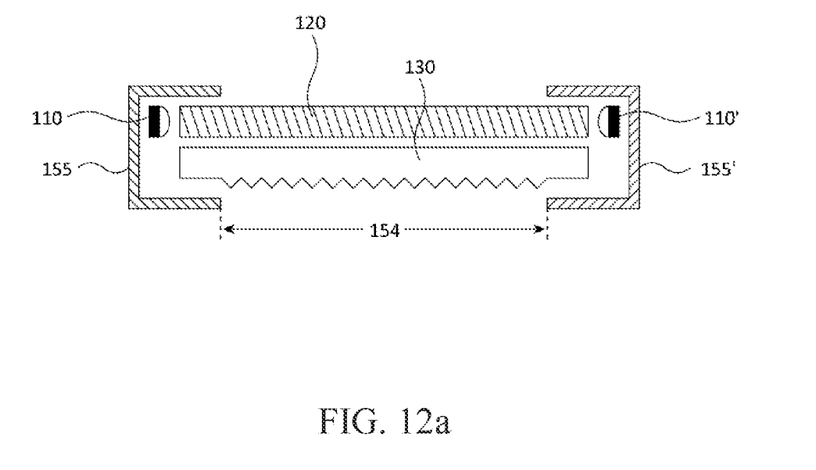

FIG. 12a shows a cross section of the lighting strip according to the invention, comprising solid state lighting elements 110 and 110', light extraction layer 120, and glare reducing layer 130. The lighting strip further comprises the shielding reflectors 155 and 155', that can be part of a housing including a bottom surface including a light exit window 154. Next to shielding the solid state lighting elements 110 and 110', the shielding reflector 155, 155' can also be used as a clamp for keeping the different components of the lighting strip together.

Figure 12B:
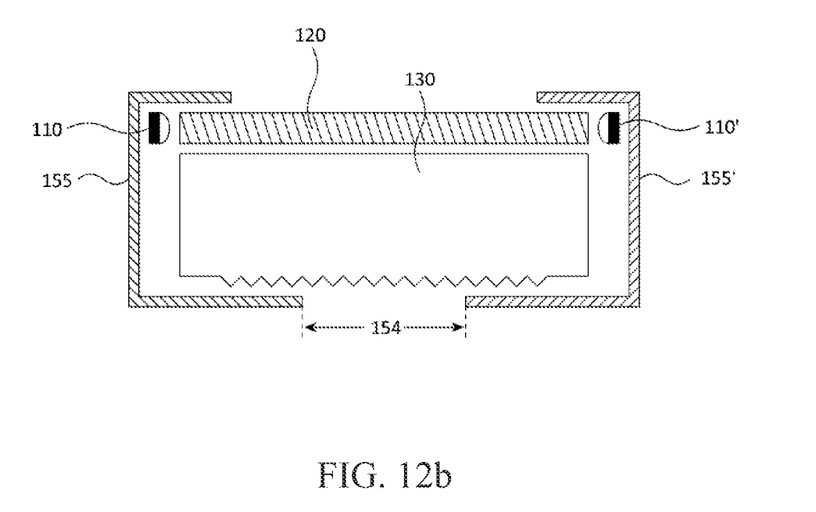
Figure 12C:
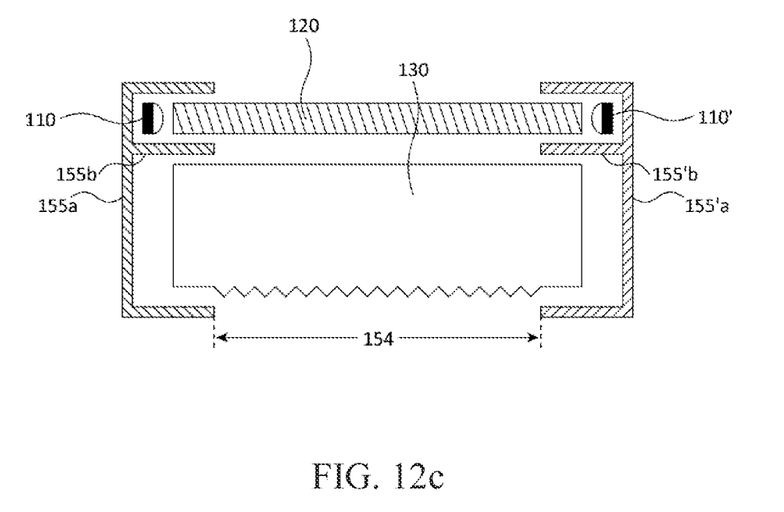
Figure 12D:
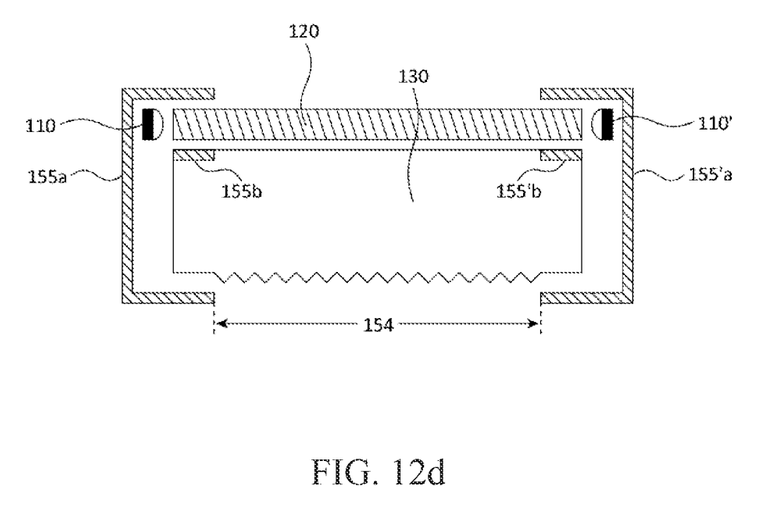

As shown in FIG. 12b, with increasing thickness of the glare reducing layer 130, the extension of the shielding reflector 155, 155' at the viewing side of the lighting strip has to increase to maintain sufficient shielding of the solid state lighting elements 110, 110'. Such extension reduces the area of the light exit window 154 and thereby the efficiency of the lighting system as a whole, especially when the lighting strips have a small width of for example 24 mm. This drawback can be overcome by arranging the shielding reflector 155, 155' to also provide shielding in between the light extraction layer 120 and the glare reducing layer 130, as indicated in FIG. 12c. The additional shielding 155b, 155'b may be provided as part of the glare reducing layer 130 (on the side facing the light extraction layer 120), as shown in FIG. 12d. This can be easily implemented by applying, for example, a piece of tape because mechanical rigidity is provided by the glare reducing layer 130 itself. This also reduces complexity of production as the number of separate (loose) components is reduced. The additional shielding 155b, 155'b may also be provided as part of the light extraction layer 120. This also has the advantage of reduced complexity of production by having a reduced number of separate (loose) components. Furthermore, it has the additional advantage that a PCB (that holds the solid state lighting elements) may be used for providing the shielding. The additional shielding 155b, 155'b in between the light extraction layer 120 and the glare reducing layer 130 may be specularly reflective, diffusively reflective, or absorbing. Because this shielding is in optical contact it is preferred that it is specularly reflective (absorbing shielding or diffusely reflective shielding could lead to artifacts or reduced efficiency).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A modular panel system comprising a primary panel support element, a secondary panel support element detachably coupled to the primary panel support element, and a solid state lighting strip integrated with the secondary panel support element, the solid state lighting strip comprising:
    a housing having a top surface facing the secondary panel support element and a bottom surface including a light exit window,
    a plurality of solid state lighting elements disposed in the housing,
    a light extraction layer disposed in the housing and between the solid state lighting elements,
    a glare reducing layer at the light exit window, and
    shielding reflectors between the lighting elements and the glare reducing layer,
wherein the light extraction layer and the glare reducing layer are arranged opposite each other,
wherein the plurality of solid state lighting elements are arranged adjacent to the light extraction layer such that light emitted by said solid state lighting elements is coupled into the glare reducing layer via the light extraction layer and the light exits through the light exit window of the housing,
wherein the plurality of solid state lighting elements comprises a first group of solid state lighting elements and a second group of solid state lighting elements on opposite sides of the light extraction layer, and
wherein a pitch of the solid state lighting elements in said groups is less than twice of a width of the light extraction layer.

2. The modular panel system of claim 1, wherein the solid state lighting elements are placed at regular intervals between the light extraction layer and at least one of the side surfaces.

3. The modular panel system of claim 2, wherein the surface of the light extraction layer opposite the surface facing the glare reducing layer carries a reflective member.

4. The modular panel system of claim 2, wherein the inner walls of the housing are reflective.

5. The modular panel system of claim 1, wherein each of the first and second groups of solid state lighting elements comprises subsets of solid state lighting elements having different colors, said subsets being individually controllable.

6. The modular panel system of claim 5, wherein the solid state lighting elements in the first group are offset in relation to the solid state lighting elements in the second group by half said pitch.

7. The modular panel system recited in claim 1, further comprising:
    a support grid for attaching the primary panel support element to a building structure;
    a plurality of panels supported by the support grid, wherein at least one first panel of said plurality of panels is mounted to the support grid via the primary panel support element and the secondary support element.

8. The modular panel system of claim 7, wherein:
    the primary and secondary panel support elements are placed in the support grid at a pitch (P);
    each of the solid state lighting strips comprise a light exit window having a width (W); and
    the ratio W/P lies in the range of 0.02 to 0.08.

9. The modular panel system of claim 8, wherein the ratio W/P is about 0.04.

10. A lighting system including a plurality of solid state lighting strips of the modular panel system as claimed in claim 1, further comprising a controller for setting the light output of individual solid state lighting strips based at least in part of at least one of incident daylight, room layout and room occupancy.

11. A solid state lighting strip for mounting in a panel support element of a modular panel system, the solid state lighting strip comprising:
    a housing having a top surface facing the panel support elements and a bottom surface including a light exit window,
    a plurality of solid state lighting elements disposed in the housing,
    a light extraction layer disposed in the housing and between the solid state lighting elements,
    a glare reducing layer at the light exit window, and
    shielding reflectors between the lighting elements and the glare reducing layer,
    wherein the plurality of solid state lighting elements is arranged such that the light emitted by said lighting elements is coupled into the glare reducing layer via the light extraction layer,
    wherein the solid state lighting strip is structured for integration in said panel support element such that at least one first panel of said modular panel system is primarily mounted to a support structure of said panel support element via the solid state lighting strip and such that a primary means of supporting the weight of the at least one first panel is via the solid state lighting strip,
    wherein said panel support element comprises a primary support element fixed to a building structure and a secondary support element detachably coupled to the primary support element, and wherein the solid state lighting strip is disposed on the secondary support element.

12. The solid state lighting strip of claim 11, wherein the modular panel system further comprises:
    a support grid including the panel support element of claim 11;
    wherein the support grid comprises the solid state lighting strip of claim 11 and wherein the panel support element of claim 11 is configured such that the at least one first panel is mounted to the support grid via the support structure of the panel support element of claim 11.

13. The modular panel system of claim 12, further comprising the at least one first panel.

14. A modular panel system comprising:
    a support grid comprising support members for attaching to a building structure and panel support elements for extending between the support members; and
    a plurality of panels supported by the panel support elements,
    wherein the support grid comprises a plurality of solid state lighting strips, wherein each of the solid state lighting strips comprises:
        a housing having a top surface facing a respective one of the panel support elements and a bottom surface including a light exit window, a plurality of solid state lighting elements disposed in the housing, a light extraction layer disposed in the housing and between the solid state lighting elements, a glare reducing layer at the light exit window, and shielding reflectors between the lighting elements and the glare reducing layer, wherein the plurality of solid state lighting elements are arranged such that light emitted by said lighting elements is coupled into the glare reducing layer via the light extraction layer and the light exits through the light exit window of the housing, wherein a first panel of the plurality of panels is primarily mounted to a support structure of a first panel support element of the panel support elements via a solid state lighting strip of the plurality of solid state lighting strips that is integrated in said first panel support element, wherein the first panel is detachably mounted to said support grid via a support structure and wherein a primary means of supporting the weight of the first panel is via the solid state lighting strip.

\* \* \* \* \*